United States Patent [19]

Froehlich et al.

[11] 4,174,379

[45] Nov. 13, 1979

[54] MANUFACTURE OF AMMONIUM NITRATE

[75] Inventors: Robert E. Froehlich, New Providence; Reginald A. Baldini, South Orange, both of N.J.

[73] Assignee: Foster Wheeler Energy Corporation, Livingston, N.J.

[21] Appl. No.: 895,884

[22] Filed: Apr. 13, 1978

[51] Int. Cl.² .................................................. C01B 1/18
[52] U.S. Cl. ................................. 423/396; 260/555 A; 422/189; 71/59
[58] Field of Search ....................... 423/238, 396, 420; 260/555 A; 23/263, 259.1, 260; 71/59, 30

[56] References Cited

U.S. PATENT DOCUMENTS

| | | | |
|---|---|---|---|
| 2,087,325 | 7/1937 | Lawrence et al. | 423/396 X |
| 3,144,321 | 8/1964 | Butikofer | 423/396 |
| 3,146,263 | 8/1964 | Otsuka | 260/555 A |
| 3,285,695 | 11/1966 | Cook et al. | 423/396 |
| 3,690,820 | 9/1972 | Newman et al. | 423/396 |
| 3,746,528 | 7/1973 | Johnson | 71/30 |

*Primary Examiner*—G. O. Peters
*Attorney, Agent, or Firm*—Marvin A. Naigur; John E. Wilson; John J. Herguth, Jr.

[57] ABSTRACT

A process and process plant for the manufacture of ammonium nitrate using urea process tail gas are provided. Water is reacted with nitrogen dioxide to form nitric acid, which is thereafter reacted with the urea process tail gas to yield an aqueous solution and a tail gas including carbon dioxide, ammonia and water vapor, A carrier gas is added to the tail gas, in order to control the amount of water vapor condensed out of the tail gas upon its being cooled to approximately 60 degrees C. Condensed water vapor is removed and passed to an absorption tower for use in the formation of the nitric acid, while the remainder of the cooled resultant stream is passed to the atmosphere.

19 Claims, 5 Drawing Figures

MANUFACTURE OF AMMONIUM NITRATE

BACKGROUND OF THE INVENTION

This invention relates to fertilizer manufacturing, and more specifically, to the manufacture of urea-ammonium nitrate solutions wherein the ammonium nitrate is produced using urea process emissions.

In known processes for the production of fertilizers such as urea and/or ammonium nitrate, a substantial quantity of reaction by-product water is obtained from the urea process and from the nitric acid process unit associated with the ammonium nitrate process. This water can be distributed in three ways. Some of the water can be included in the urea-ammonium nitrate product solution, but the relative amount of water included in the product solution is usually constrained in the product specification to about 20%, being fixed by a requirement to obtain a solution containing 32% nitrogen. Another portion of the water can be sent to the absorption zone of the nitric acid process unit for use in the manufacture of nitric acid. Some of the water sent to the nitric acid plant is passed to the atmosphere being contained in the tailgas passed thereto. However, this amount of the water is very small, since it is proportional to the amount of nitrogen oxides passed in this tailgas, which must be controlled in order to comply with emission control standards. The remainder of the water can either be removed as a liquid from the ammonium nitrate process unit, or can be included in the tailgas passed from the condensing zone of the ammonium nitrate process unit to the atmosphere. When the ammonium nitrate process tailgas expelled to the atmosphere contains carbon dioxide, which would occur when crude tail gas emissions from a once-through type urea process unit is employed to provide ammonia as feed to the ammonium nitrate process unit, a fume can be created which has an opacity that may exceed the opacity level allowed by emission controls standards. The fume is comprised of particulate ammonium carbonate and/or ammonium bicarbonate, which form after emission of the ammonium nitrate tail gas to the atmosphere when it is expelled at a temperature above 60° C. However, for the amount of condensate recovered in the condensing zone not to exceed the amount which can be recirculated for use elsewhere in the urea and/or ammonium nitrate processes, such as in the absorption zone of the nitric acid process unit, the tail gas expelled from the condensing zone must be at a temperature of no less than 80° C. If the ammonium nitrate process tail gas is cooled below 80° C., more condensate than can be used elsewhere in the processes is obtained. The excess condensate would then have to be treated and thereafter disposed of.

When the ammonium nitrate process tail gas is cooled to 60° C. before emission of the tail gas to the atmosphere, particles of ammonium carbonate and/or ammonium bicarbonate form, which can be removed before the unreacted remainder of the carbon dioxide and ammonia contained in the tail gas is passed from the ammonium nitrate process unit to the atmosphere. However, as stated above, when the ammonium nitrate process tail gas is cooled to a temperature below 80° C., excess water condenses out of the tail gas which cannot be recirculated for use in the process and must be disposed of.

The instant invention provides a process plant and a method for disposing of by-product water obtained from urea-ammonium nitrate processes such that emission controls standards can be met, and yet excess liquid waste effluent is avoided. Hence, treatment and subsequent disposal of the excess liquid effluent are not required.

SUMMARY OF THE INVENTION

In accordance with an illustrative embodiment demonstrating features and advantages of the present invention there is provided a continuous process for the manufacture of ammonium nitrate from urea process effluent. Accordingly, the urea process tail gas comprising ammonia, carbon dioxide and water vapor is reacted with nitric acid to yield an aqueous solution including ammonium nitrate and water, and a tail gas containing carbon dioxide, ammonia and water vapor. A carrier gas is added to the tail gas before emission of the tail gas to the atmosphere. Upon cooling of the tail gas to which the carrier gas has been added, the amount of water vapor condensed out of the tail gas is controlled such that no more water vapor is condensed than can be used elsewhere in the process. Furthermore, the amounts of pollutants contained in the tail gases emitted from the ammonium nitrate process can be controlled to allow for compliance with emission control standards.

BRIEF DESCRIPTION OF THE DRAWING

The above brief description, as well as further objects, features and advantages of the present invention will be more fully appreciated by referring to the following description of presently preferred but nonetheless illustrative embodiment in accordance with the present invention when taken in connection with the accompanying drawings wherein.

DESCRIPTION OF THE PREFERRED EMBODIMENT

Figure 1:
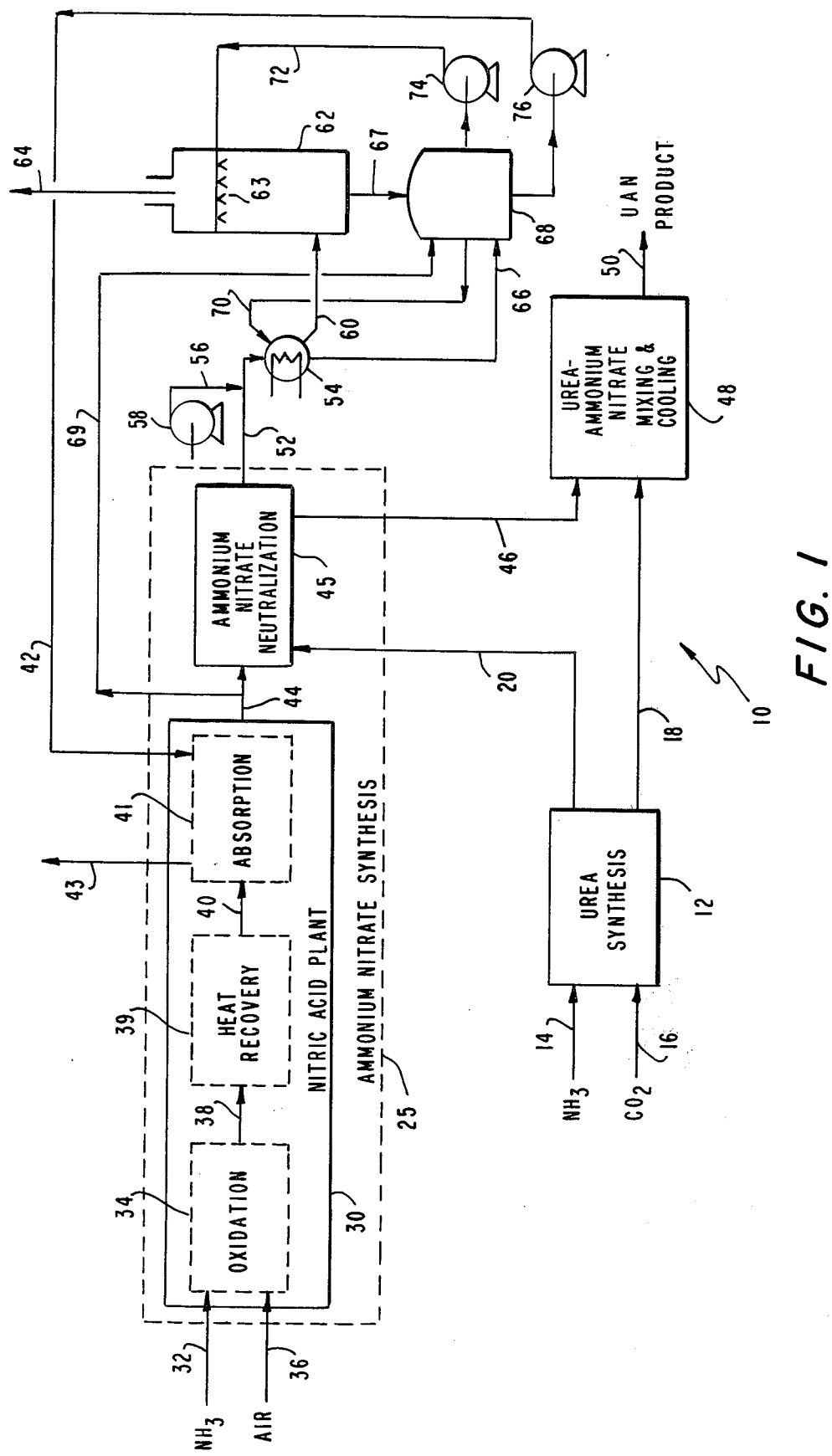
FIG. 1 is a schematic representation of a urea-ammonium nitrate plant incorporating the instant invention, with the gaseous effluent of the urea process being used as feed for the ammonium nitrate process.

Referring to FIG. 1 of the drawing, there is shown a schematic representation of a process 10 for manufacturing a urea-ammonium nitrate solution. The urea-ammonium nitrate solution product comprises an aqueous mixture of approximately 35.4% by weight urea, 44.3% by weight ammonium nitrate and 20.3% by weight water.

Urea is manufactured in the once-through type urea synthesis process unit 12 of the plant schematically depicted in the drawing. Ammonia is passed into the synthesis section 12 through line 14, while compressed carbon dioxide is introduced to the synthesis section through line 16. Within synthesis section 12 the ammonia and carbon dioxide react to form urea and water, which are then removed as a product stream through line 18. Also included in this urea product stream is some unreacted ammonia. A portion of unreacted ammonia and carbon dioxide, along with water vapor formed during synthesis will be removed as crude tail gas emission through line 20.

The ammonium nitrate process synthesis unit 25 comprises nitric acid plant 30 and neutralization zone 45. Nitric acid to be used in the manufacture of the ammonium nitrate is produced in the nitric acid plant 30. Ammonia is introduced through line 32 to the oxidation zone 34, wherein it reacts with oxygen contained in the air introduced to the oxidation zone through line 36. Oxidation products are passed through line 38 to a heat recovery zone 39, wherein heat given off during oxidation is removed. The oxidation products, which include nitrogen dioxide, plus unreacted oxygen and nitrogen are then passed through line 40 to absorption zone 41. Water is also introduced to the absorption zone, being introduced thereto through line 42. Within zone 41 water absorbs the nitrogen dioxide to form nitric acid. A tail gas containing nitrogen, water vapor and oxides of nitrogen is vented to the atmosphere through line 43. A product stream of nitric acid and water is then passed through line 44 to neutralization zone 45 within which the nitric acid reacts with ammonia to form ammonium nitrate. The ammonia with which the nitric acid reacts in zone 45 is contained in the crude tail gas emission from the urea process unit, which is passed to the neutralization zone through line 20. A product stream containing ammonium nitrate, unreacted nitric acid and water is removed from the neutralization zone 45 through line 46, and is passed into urea-ammonium nitrate mixing and cooling zone 48. Line 18, through which the urea product stream containing urea, water and unreacted ammonia is passed, communicates with zone 48 also. Within zone 48 the unreacted ammonia passed from line 18 reacts with unreacted nitric acid passed through line 46 to form additional ammonium nitrate; the urea, ammonium nitrate and water are cooled within zone 48 and are then removed through line 50 as urea-ammonium nitrate product solution at a temperature of approximately 38° C. The solution includes approximately 35.4% by weight urea, 44.3% by weight ammonium nitrate and 20.3% by weight water.

Also removed from neutralization zone 45 is a tail gas containing unreacted carbon dioxide and ammonia, and water vapor; this ammonium nitrate process tail gas is passed through line 52 to condenser 54. Within condenser 54 the temperature of the tail gas is reduced to approximately 60° C., and as a result of this cooling, carbon dioxide and ammonia react to form particles of ammonium carbonate and/or ammonium bicarbonate.

Prior to the passing of the tail gas to the condenser 54 a carrier gas is introduced to the tail gas stream via line 56, and fan 58. In the preferred embodiment the carrier gas is air, which is forced into line 52 upstream of the location where line 52 communicates with condenser 54. By introducing carrier gas along with tail gas to the condenser, as the tail gas is cooled, less water vapor will condense than would have condensed had no carrier gas been introduced. It is to be understood that although air is discussed herein as the preferred carrier gas, any gas which would contain little or no condensibles could be used as a carrier gas. For example, a portion of the nitric acid plant tail gas vented through line 43 could be used as the carrier gas as long as the amount of water vapor contained therein is low enough not to offset the effect of the other constituents of this tail gas. That is, this tail gas could be used as the carrier gas as long as the amount of water vapor, including water vapor in the nitric acid plant tail gas, which condenses in condenser 54 does not exceed the amount which can be recirculated for use in the plant. If the nitric acid plant tail gas were to be used as the carrier gas, the fan 58 may not be needed, since the pressure of the tail gas could exceed that of the gas passing through line 52.

Ammonium nitrate process tail gas is removed from condenser 54 through line 60 at a temperature of approximately 60° C. This tail gas may contain unreacted carbon dioxide, traces of ammonia and water vapor which could be emitted to the atmosphere.

However, dependent upon the effectiveness of the washing of the particles of ammonium carbonate and/or ammonium bicarbonate out of the tail gas within condenser 54, an excessive amount of such particles may be entrained in the tail gas passed through line 60. To insure against passage of excess amounts of ammonium carbonate and/or ammonium bicarbonate to the atmosphere, the tail gas can be scrubbed within tower 62. Scrubbing medium is sprayed through sprayers 63 in countercurrent relationship to the tail gas within tower 62 in order to remove any particulate ammonium carbonate and/or ammonium bicarbonate from the tail gas before its emission to the atmosphere through line 64. Scrubbing medium is returned to condensate tank 68 through line 67. It is to be understood that other entrained solids removal devices could be used in lieu of scrubbing tower 62, such as mechanical type filters. It is to be understood that other direct contact scrubbing means such as venturi scrubber, for example, could be used in lieu of a scrubbing tower in order to effect removal of entrained solids.

Water vapor which condenses into liquid within condenser 54 is passed through line 66 to condensate tank 68, with particles of ammonium carbonate and/or ammonium bicarbonate being entrained in the liquid passed to the condensate tank 68. As an alternative measure to enhance the removal of the particulate ammonium carbonate and/or ammonium bicarbonate from the cooled tail gas before the tail gas is passed through line 60, a portion of the condensate can be recirculated from tank 68 to condenser 54 through line 70 and used for washing the cooled tail gas within condenser 54. It is to be understood that, when desired, either or both the tower 62 or recirculating line 70 can be used to remove particles of ammonium carbonate and/or ammonium bicarbonate from the tail gas before emission to the atmosphere.

When the scrubbing medium used in tower 62 includes a portion of the condensate taken from the process a portion of the nitric acid obtained from plant 30 is removed from line 44, and passed to tank 68 through branch line 69. This is done in order to insure that the condensate is acidic and to prevent losing free ammonia, which could be entrained in the condensate, to the atmosphere. By introducing the nitric acid to the condensate, the free ammonia is "tied up" and will not be stripped from the condensate when the condensate comes in contact with air. Line 72 is connected between condensate tank 68 and the sprayers 63 for supplying spraying medium to tower 62. Pump 74 is disposed within line 72 for pumping condensate to the sprayers 63.

Condensate is also passed from tank 68 through line 42 to the absorption zone 41 of the nitric acid plant 30. Pump 76 is disposed within line 42 for pumping the condensate to the absorption zone 41. When neither line 70, nor tower 62 is employed, all of the condensate can be passed through line 42 to zone 41.

Figure 2:
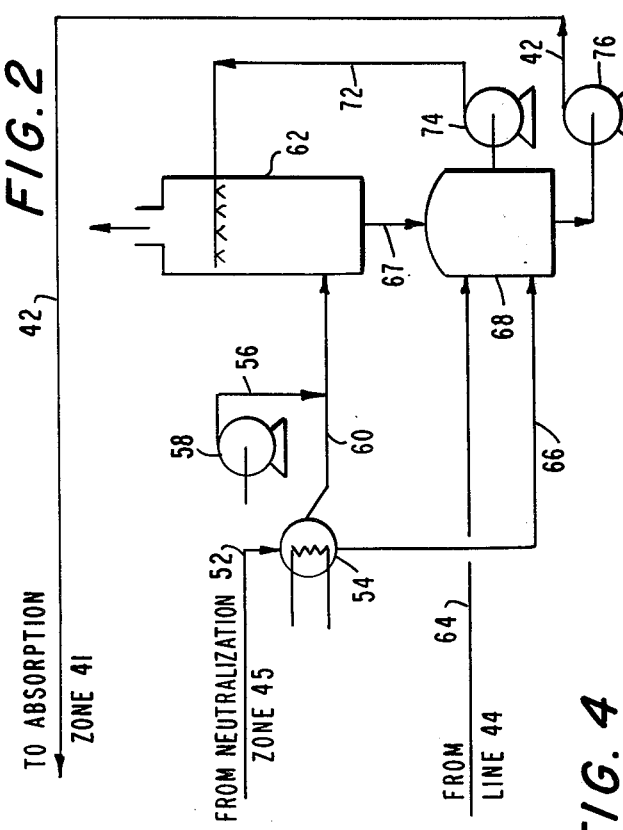
FIG. 2 is an enlarged schematic representation of the pollution control unit of the instant invention depicting an alternative embodiment of the invention in which the carrier gas is introduced downstream of the condenser.

Turning to FIG. 2, an alternative embodiment of the pollution control system of the instant invention is illustrated schematically. In this embodiment the ammonium nitrate process tail gas passed through line 52 is cooled in condenser 54 to approximately 80° C. Water condensed out of the tail gas is passed through line 66 to condensate tank 68. Since the tail gas has been cooled to only 80° C. the amount of condensate passed to tank 68 will not exceed the amount which can be recirculated for use elsewhere in the plant. Carrier gas is added to the tail gas passed from the condenser 54 via line 56 and fan 58, and the combined stream is passed into tower 62. The combined stream rises in tower 62 coming in contact with scrubbing medium thereby cooling the combined stream, including the tail gas to approximately 60° C. As a result of this cooling, ammonium carbonate and/or ammonium bicarbonate particles form within tower 62, and are removed from the tail gas during the scrubbing of the rising gas. The scrubbing medium can comprise a portion of the condensate passed from tank 68 via line 72 and pump 72, as shown. Due to the presence of the inert carrier gas, the amount of water vapor which condenses from the tail gas during the scrubbing operation, will not exceed the amount which can be used elsewhere in the plant even though the tail gas temperature is reduced to approximately 60° C. That portion of the tail gas which does condense into water is passed, along with scrubbing medium via line 67 to tank 68.

Figure 3:
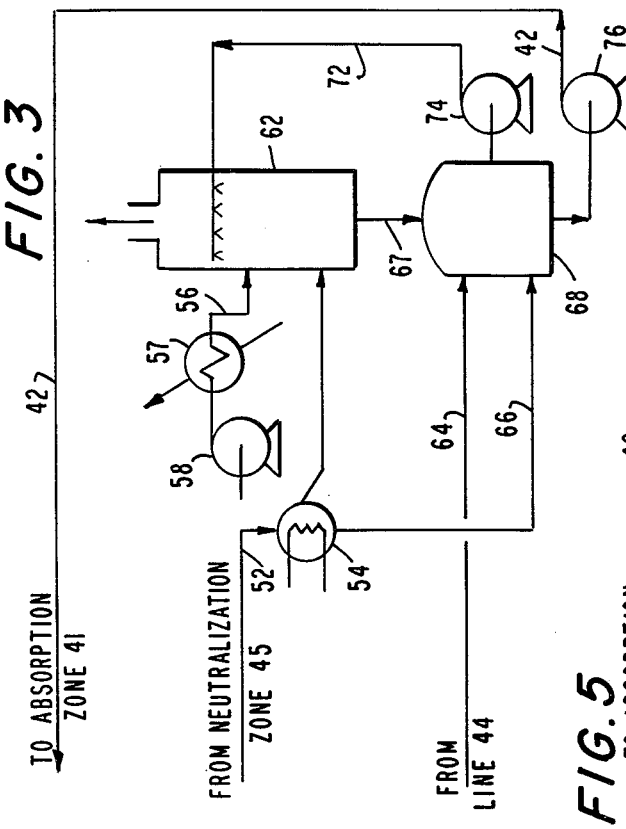
FIG. 3 is an enlarged schematic representation of the pollution control system of the instant invention depicting another alternative embodiment of the invention in which the carrier gas is introduced into the tower downstream of the condenser.

In FIG. 3 another alternative embodiment of the pollution control system of the invention is shown. In this embodiment the tail gas passed through line 52 is cooled to approximately 60° C. within condenser 54. As a result ammonium carbonates and/or ammonium bicarbonates form within the condenser 54, and can be removed from the tail gas. However, the amount of water vapor which condenses to liquid within condenser 54 will exceed the amount that can be used elsewhere in the plant, including that amount which can be used in the nitric acid plant 30. The cooled tail gas is passed through line 60 into tower 62. Carrier gas is passed through line 56 and is heated by heat exchanger 57 before being introduced into tower 62. A portion of the condensate passed through line 66 into tank 68 is circulated through line 72 and pump 74 for use as scrubbing medium within tower 62. Another portion of the condensate is passed via pump 76 and line 42 to absorption zone 41 of nitric acid plant 30. Within tower 62, scrubbing medium washes entrained particles of ammonium carbonate and/or ammonium bicarbonate from the ammonium nitrate process tail gas. In the presence of the heated carrier gas, the excess portion of the condensate evaporates, and is removed from the tower 62 along with the cooled process tail gas.

Figure 4:
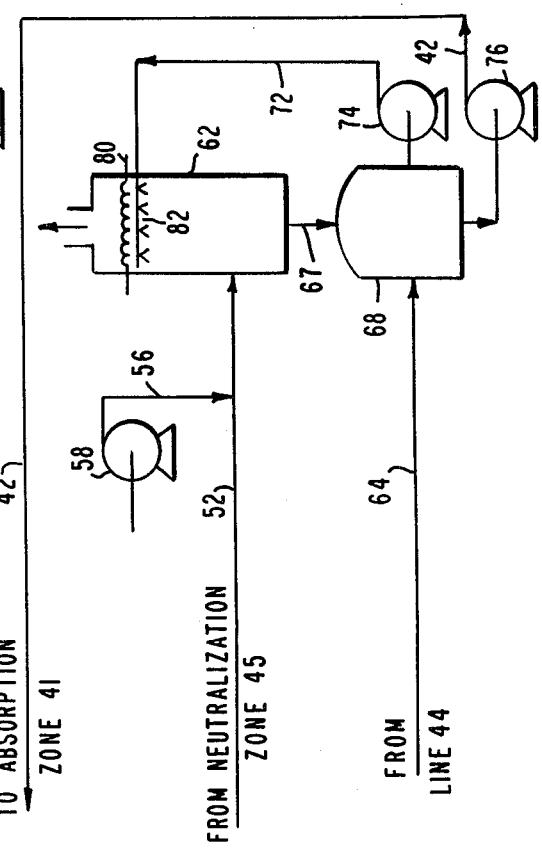
FIG. 4 is an enlarged schematic representation of the pollution control system of the instant invention depicting still another alternative embodiment of the invention in which the condenser has been eliminated and the carrier gas is introduced to the tail gas which is then introduced to a scrubbing tower.

FIG. 4 depicts yet another embodiment of the pollution control system of the instant invention. In this embodiment, no condenser is utilized; the ammonium nitrate process tail gas is passed via line 52 into tower 62. Carrier gas is introduced to the tail gas via line 56 and fan 58 before the tail gas is passed into tower 62. Cooling coils 80 are disposed adjacent trays 82 located within 62. As the combined tail gas and carrier gas stream rises in tower 62, it is cooled as it passes over coils 80. As a result, water vapor condenses out of the tail gas, and falls to the bottom of tower 62. The condensate is then passed via line 42 and pump 76 to absorption zone 41 of nitric acid plant 30.

Figure 5:
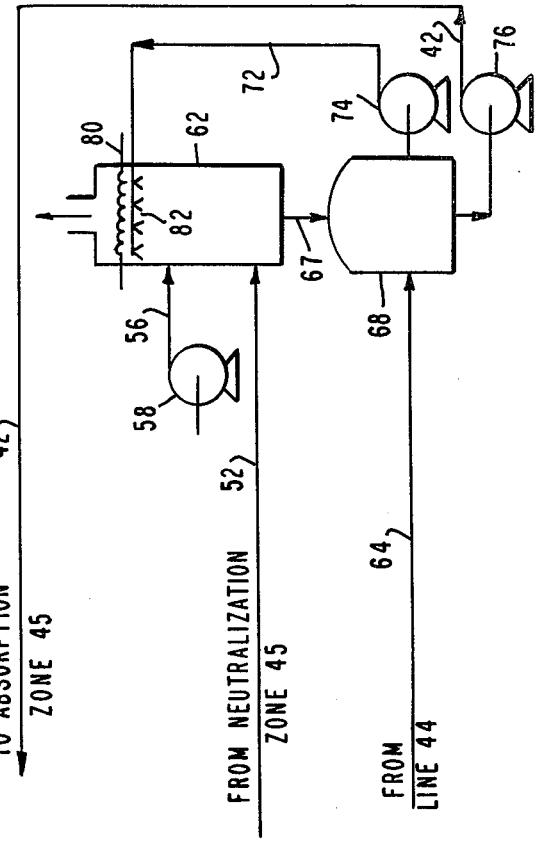
FIG. 5 is an enlarged schematic representation of the pollution control system of the instant invention depicting another embodiment of the invention in which the condenser has been eliminated, and the carrier gas is introduced directly into the tower.

In FIG. 5 another embodiment is shown, which is substantially similar to that of FIG. 4. In this embodiment the carrier gas is introduced directly into tower 62 via line 56 and fan 58.

In operation ammonia and carbon dioxide are introduced to the urea synthesis unit 12 through lines 14 and 16 respectively. The ammonia and carbon dioxide react to form urea, which is removed from unit 12 through line 18. The urea thus removed is entrained in a solution also including water and unreacted ammonia. A crude tail gas emission including unreacted ammonia and carbon dioxide, and water vapor is also removed from unit 12, being passed through line 20. Simultaneous with the production of urea, nitric acid is produced in nitric acid plant 30. Ammonia and air are introduced to oxidation zone 34 of plant 30 through lines 32 and 36 respectively. Within zone 34 the ammonia and oxygen contained in the air react to form nitrogen oxides. The oxidation products are passed via line 38 to heat recovery zone 39 for removal of heat produced during oxidation. Thereafter the products are passed to absorption zone 41. Also introduced to zone 41 is water contained in the condensate taken from tank 68 or from tower 62, and passed through line 42 by pump 76. Within absorption zone 41 the water and nitrogen dioxide react to form nitric acid, which is removed therefrom through line 44. A tail gas containing nitrogen, water vapor and oxide of nitrogen is vented to the atmosphere through line 43.

The nitric acid is introduced via line 44 to ammonium nitrate process neutralization zone 45, wherein it reacts with the ammonia contained in the urea process crude gaseous effluent which is passed to neutralization zone 45 via line 20. Ammonium nitrate product, unreacted nitric acid and water are then sent via line 46 to the mixing and cooling zone 48. Urea process solution, including urea, water and unreacted ammonia is introduced to mixing and cooling section 48 via line 18. Within section 48 the unreacted ammonia and nitric acid react to form additional ammonium nitrate, the solution is mixed, and then cooled to approximately 38° C.

Tail gas including unreacted carbon dioxide and ammonia, and water vapor is removed from neutralization zone 45 via line 52. A carrier gas, such as air, is added to the tail gas via line 56 and fan 58 before emission of tail gas to the atmosphere. In the embodiment of FIGS. 1, 4 and 5 the tail gas is added before cooling the tail gas in condenser 54 or tower 62. In the embodiments of FIGS. 2 and 3 carrier gas is added after cooling of the tail gas in condenser 54. The combined stream of tail gas and carrier gas is cooled in order to promote formation of particles of ammonium carbonate and/or ammonium bicarbonate within the condenser 54 and/or tower 62, thereby precluding formation of such particles after emission of the tail gas to the atmosphere. Condensate obtained from cooling of the tail gas is passed through line 42 and pump 76 to absorption zone 41 of nitric acid plant 30. Due to the presence of the inert carrier gas during the cooling of the tail gas, all condensate obtained from the ammonium nitrate process can be used elsewhere in the plant and hence there is not any excess condensate obtained which must be treated and then discarded.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention.

What is claimed is:

1. A process for the manufacture of ammonium nitrate using urea process tail gas, said tail gas including ammonia, carbon dioxide and water vapor, said process including the steps of:
   (a) reacting water with nitrogen dioxide in an absorption tower to form nitric acid;
   (b) reacting said urea process tail gas with said nitric acid to yield an aqueous solution including ammonium nitrate and water, and a tail gas including carbon dioxide, ammonia and water vapor;
   (c) adding a carrier gas to said ammonium nitrate process tail gas to yield a resultant gaseous stream;
   (d) cooling said resultant gaseous stream to approximately 60 degrees C., a portion of said water vapor included in said resultant stream being condensed to water, a portion of said ammonia reacting with a portion of said carbon dioxide to form ammonium carbonate and/or ammonium bicarbonate, said carrier gas acting to prevent condensation of some of said water vapor included in said resultant gaseous stream;
   (e) separating said condensed water from said cooled resultant stream;
   (f) passing said cooled resultant gaseous stream including a water vapor portion to the atmosphere, and
   (g) passing said water to said absorption tower for use in said formation of nitric acid.

2. The process of claim 1 further comprising the step of recirculating a portion of said condensed water for use in washing said cooled resultant gaseous stream in order to wash said particles of ammonium carbonate and/or ammonium bicarbonate from said resultant gaseous stream.

3. The process of claim 1 further comprising the steps of passing said cooled resultant gaseous stream to scrubbing means, said stream being scrubbed therein to effect removal of entrained particles of ammonium carbonate and/or ammonium bicarbonate therefrom.

4. The process of claim 1 wherein said step of cooling said resultant gaseous stream to approximately 60° C. comprises passing said resultant gaseous stream to scrubbing means wherein said resultant gaseous stream is passed in direct contact relationship with a scrubbing medium thereby cooling said resultant gaseous stream.

5. The process of claim 1 further comprising the step of cooling said ammonium nitrate process tail gas to approximately 80° C., a portion of said water vapor included in said tail gas condensing to water as a result thereof, said carrier gas being added to said tail gas after said cooling of said tail gas to 80° C., and wherein said step of cooling said resultant gaseous stream to approximately 60° C. comprises passing said resultant gaseous stream to scrubbing means wherein said resultant gaseous stream is passed in direct contact relationship with a scrubbing medium thereby cooling said resultant gaseous stream.

6. The process of claim 5 wherein the scrubbing medium comprises condensate obtained during said step of cooling said ammonium nitrate process tail gas, and further comprising the step of adding nitric acid to said scrubbing medium to make said medium acidic.

7. The process of claim 1 further comprising the step of cooling said tail gas to approximately 60° C. prior to the addition of said carrier gas, thereby condensing water vapor included in said tail gas, and wherein said carrier gas is heated before addition thereof to said tail gas, said heated carrier gas and said tail gas being passed into scrubbing means wherein said carrier gas and tail gas combine to form said resultant gaseous stream, said step of cooling said gaseous stream comprising the washing of said resultant gaseous stream with said condensed water vapor whereby said heated carrier gas included in said resultant gaseous stream is cooled, a portion of said condensed water vapor being vaporized, said vaporized portion thereafter being emitted to the atmosphere, and further comprising the step of adding nitric acid to said condensed water vapor to insure that said condensed water vapor is acidic prior to its use in washing said resultant gaseous stream.

8. The process of claim 7 wherein said step of cooling said resultant gaseous stream comprises passing said stream in direct contact relationship with a scrubbing medium, said scrubbing medium being at a low enough temperature to insure that said resultant gaseous stream is cooled to approximately 60° C.

9. The process of claim 8 further comprising the steps of passing said stream of ammonium nitrate process tail gas into scrubbing means and simultaneously passing said carrier gas into said scrubbing means, said carrier gas and said tail gas therein combining to form said resultant gaseous stream, said resultant gaseous stream thereafter being passed in a direct contact relationship with said scrubbing medium, said scrubbing medium being at a low enough temperature to insure that said resultant gaseous stream is cooled to approximately 60° C.

10. A process plant for the manufacture of ammonium nitrate using urea process tail gas emission including ammonia, carbon dioxide and water vapor comprising:
    (a) a nitric acid process unit including oxidation and absorption zones.

11. The process plant of claim 10 wherein said means for controlling the amount of water vapor condensed from said tail gas comprises a conduit adapted to introduce air to said tail gas upstream of said condensing means.

12. The process plant of claim 11 further comprising means for recirculating a portion of said condensed water to said condenser for washing said tail gas.

13. The process plant of claim 11 further comprising scrubbing means in flow communication with said condenser adapted for scrubbing said resultant gaseous stream prior to emission thereof to the atmosphere.

14. The process plant of claim 13 further comprising means for passing a portion of said water from said condenser to said scrubbing means said water being used as scrubbing medium in said tower, and means for adding nitric acid to said water used as scrubbing medium.

15. The process plant of claim 10 wherein said carrier gas is added to said tail gas downstream of said condensing means, said condensing means being adapted to cool said tail gas to approximately 80° C., and further comprising means for cooling said resultant gaseous stream to approximately 60° C.

16. The process plant of claim 10 further comprising means for heating said carrier gas, said carrier gas being added to said tail gas downstream of said condenser, said tail gas being cooled in said condenser to approximately 60° C., and scrubbing means adapted to receive and scrub said resultant gaseous stream prior to emission thereof to the atmosphere, scrubbing medium used in said scrubbing means comprising a portion of said water vapor condensed in said condensing means.

17. The process plant of claim 10 wherein said means for condensing said portion of water vapor from said tail gas comprises a scrubbing tower and cooling coils disposed within said tower and adapted to cool said resultant gaseous stream being passed therethrough, scrubbing medium comprising a portion of said water vapor condensed in said tower.

18. The process plant of claim 17 wherein said means for controlling the amount of water vapor condensed in said condensing means comprises a conduit adapted to add a carrier gas directly into said scrubbing tower.

19. The process plant of claim 17 wherein said means for controlling the amount of water vapor condensed in said condensing means comprises a conduit adapted to add a carrier gas to said tail gas upstream of said scrubbing tower.

* * * * *

UNITED STATES PATENT AND TRADEMARK OFFICE
CERTIFICATE OF CORRECTION

PATENT NO. : 4,174,379

DATED : November 13, 1979

INVENTOR(S) : Robert E. Froehlich and Reginald A. Baldini

It is certified that error appears in the above-identified patent and that said Letters Patent are hereby corrected as shown below:

Column 8, line 50, after "zones" insert
--(b) means for introducing ammonia feed to said oxidation zone;

(c) means for introducing oxygen to said oxidation zone;

(d) a neutralizing zone for reacting nitric acid with said urea process effluent, said nitric acid reacting with said urea process effluent to form an aqueous solution of ammonium nitrate entrained in water and a tail gas including carbon dioxide, ammonia and water vapor;

(e) means for passing said urea process effluent to said neutralizing zone;

(f) means communicating with said absorption zone for passing nitric acid to said neutralizing zone;

(g) means for condensing a portion of said water vapor included in said tail gas, said means being adapted to receive said tail gas from said neutralizing zone;

UNITED STATES PATENT AND TRADEMARK OFFICE
CERTIFICATE OF CORRECTION

PATENT NO. : 4,174,379

DATED : November 13, 1979

INVENTOR(S) : Robert E. Froehlich and Reginald A. Baldini

It is certified that error appears in the above-identified patent and that said Letters Patent are hereby corrected as shown below:

(h) means for controlling the amount of water vapor condensed from said tail gas, said means including means for adding a carrier gas to said tail gas to form a resultant gaseous stream;

(i) means for separating said condensate from said resultand stream;

(j) means for passing said condensed water to said absorption zone of said nitric acid process unit; and (k) means for passing said resultant gaseous stream including a water vapor portion to the atmosphere --

Signed and Sealed this

Twenty-fourth Day of February 1981

[SEAL]

Attest:

RENE D. TEGTMEYER

Attesting Officer

Acting Commissioner of Patents and Trademarks